March 3, 1964     C. E. KNEBLIK     3,123,056
COOLING SYSTEM FOR THE PRIME MOVER OF AN AUTOMOTIVE
VEHICLE HAVING AN AIR CONDITIONER
Filed Oct. 8, 1962
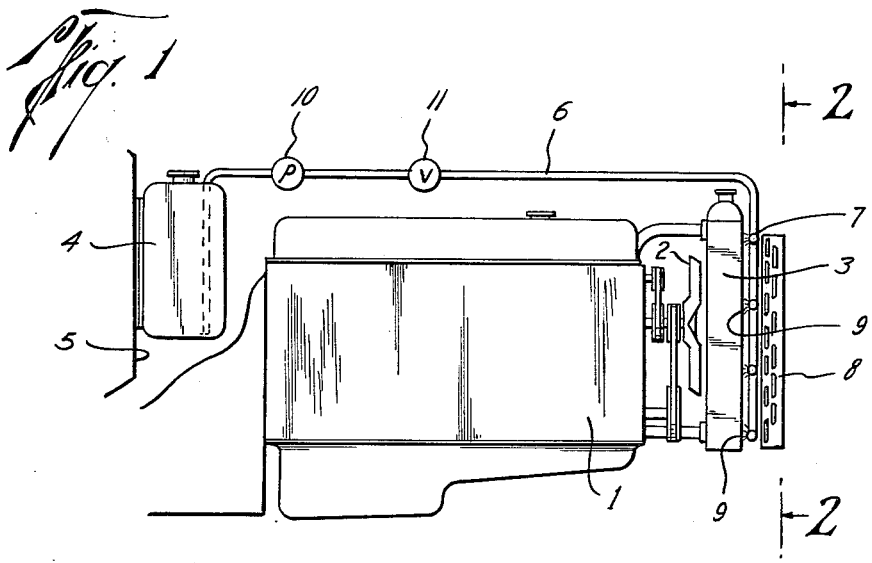
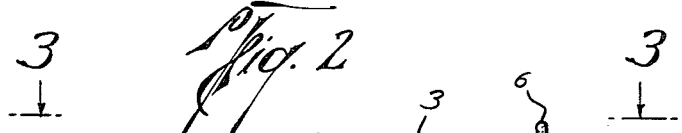
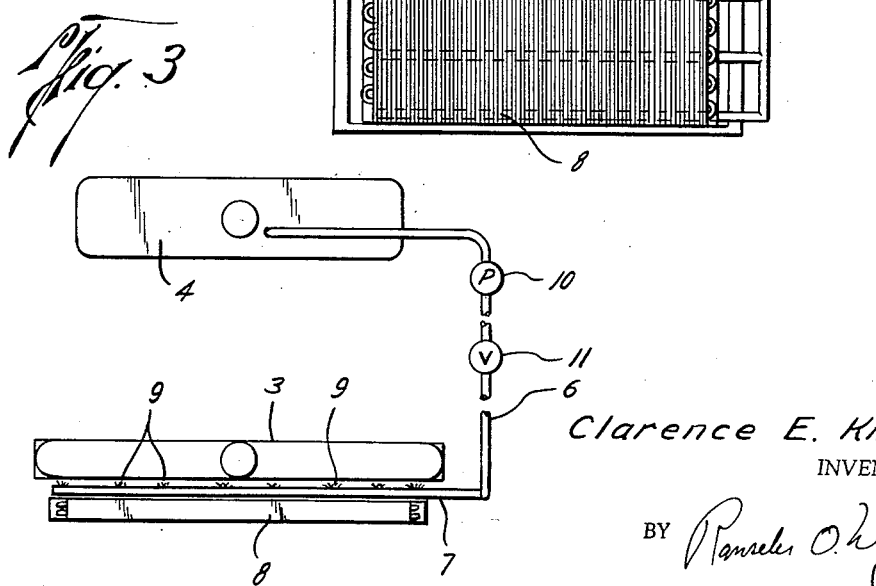
Clarence E. Kneblik
INVENTOR.
BY
ATTORNEY

United States Patent Office 3,123,056
Patented Mar. 3, 1964

3,123,056
COOLING SYSTEM FOR THE PRIME MOVER OF AN AUTOMOTIVE VEHICLE HAVING AN AIR CONDITIONER
Clarence E. Kneblik, 1845 W. Main St., Apt. 1, Houston 6, Tex.
Filed Oct. 8, 1962, Ser. No. 228,977
5 Claims. (Cl. 123—41.01)

This invention relates to new and useful improvements in a cooling system for the prime mover of an automotive vehicle having an air conditioner.

In automotive vehicles in present use, particularly passenger automobiles, equipped with air conditioning units, the prime mover of the vehicle will become overheated when it is operating at slow speed, such as in traffic, or in extreme heat or at high altitudes or even where the vehicle has a heavy load. It is an object of this invention to provide means, in addition to the usual cooling system, to provide a cooling system to relieve the overheating of the vehicle motor and to effect more efficient operation of of the air conditioner.

The usual air conditioner for vehicles now in use is equipped with an air cooled condenser located in front of the vehicle radiator, thus blocking air flow to the radiator and the heat dissipated from the air conditioner drawn by the motor fan passes through the radiator, thus decreasing the heat dissipated from the radiator, so that during slow speed or during hot weather, the radiator can not dissipate sufficient heat to efficiently cool the motor and prevent the motor from becoming overheated. It is an object of this invention to provide means for selectively cooling the vehicle radiator when the vehicle speed or ambient temperature interferes with the normal radiator cooling function.

In areas where the ambient atmosphere is arid and the temperature high, the heat dissipated from the air conditioner condenser flows through the prime mover radiator assisted by the vehicle movement and the motor fan, thus greatly reducing the dissipation of heat by the radiator and causing motor temperatures to rise beyond efficient operation levels. It is an object of this invention to provide means for cooling the air flow through the radiator thus permitting greater dissipation of heat from the radiator and by reducing the radiant heat from the radiator, permitting greater dissipation of heat from the condenser.

With the above and other objects in view, the invention has relation to certain novel features of construction, operation and arrangement of parts more particularly defined in the following specifications and illustrated in the accompanying drawings, wherein:

FIGURE 1 is a side elevational view of a vehicle motor having the cooling system installed therein.

FIGURE 2 is a front elevational view of a vehicle radiator and air conditioner condenser with the cooling system mounted therebetween, and FIGURE 3 is a top plan view of the cooling system, showing the system extending between the vehicle radiator and air conditioner condenser.

Referring now more particularly to the drawings, the numeral 1 indicates a vehicle engine, or prime mover, having the usual fan 2 and radiator 3. A tank, or receptacle of any suitable design or material, as 4 is mounted on the vehicle at any suitable location, such as the fire wall 5, and a conduit 6 leads from the tank 4 to the manifold 7, which is extended between the radiator 3 and the air conditioner condenser 8. The manifold 7 has a plurality of suitable spray outlets as 9, 9 designed to discharge a fine spray of fluid over the surface of the radiator 3. The receptacle 4 is preferably of sufficient capacity to carry a supply of cooling fluid, such as water, sufficient to last between refilling of the prime mover fuel tank.

A suitable pump, as 10, is located at any desired position in the conduit 6 and a control valve as 11 is also mounted in the conduit 6 which may be of any suitable design to provide selective metering of the volume of fluid flow through the conduit 6 and may be actuated by a remotely located switch (not shown).

When the vehicle is operated at low speed, or under any other condition where the motor becomes overheated, the switch may be actuated either manually or by heat controlled automatic instrument (not shown) to start the pump and open the valve to permit pumping of the desired amount of flow of cooling fluid from the tank 4 through the conduit 6 and into the manifold 7 where it will be discharged through the spray discharge openings in a fine spray over the surface of the radiator and assisted by the fan 2 drawn through the radiator, cooling the air simultaneously drawn through the radiator and reducing the temperature of the radiator. As the fine spray is discharged over the radiator surface, and the temperature of the radiator is lowered, the decrease of radiant heat from the radiator will permit the condenser to increase the amount of heat dissipated therefrom, increasing the amount of heat that may be removed from the vehicle in the air conditioning action.

While the foregoing is a preferred form of the invention, it is by way of illustration only, the broad principle of the invention being defined by the appended claims.

What I claim is:

1. In a cooling system for automotive vehicles having a radiator for cooling the motor and having air conditioners equipped with a refrigerant condenser therein, a storage compartment for cooling fluid, a spray manifold mounted between the radiator of the vehicle and the condenser of the air conditioner, a conduit leading from the storage compartment to the manifold, discharge openings in the manifold for directing cooling fluid onto the surface of the radiator and means for controlling the flow of cooling fluid under pressure to the manifold.

2. In a cooling system for automotive vehicles having a radiator for cooling the motor and equipped with an air conditioner having a refrigerant condenser and having the condenser of the air conditioner positioned adjacent the radiator, a spray manifold mounted between the said condenser and radiator, said manifold having discharge openings for discharging a fine spray of cooling fluid, a storage receptacle carried by the vehicle for maintaining a supply of cooling fluid, a conduit extending from the storage receptacle to the manifold and means for selectively moving fluid from said receptacle through said conduit to said manifold.

3. In a motor cooling system for automotive vehicles having a prime mover and an air conditioner, the prime mover having a radiator through which a motor cooling fluid circulates and the air conditioner having a condenser mounted adjacent the prime mover radiator, comprising a spray manifold formed of horizontal tubes in vertical alignment having discharge openings, a receptacle having cooling fluid stored therein, a conduit leading from said receptacle to said manifold and means for selectively discharging cooling fluid from said discharge openings in said spray manifold over the surface of said radiator.

4. In a motor cooling system for automotive vehicles having a prime mover and an air conditioner, the prime mover having a motor cooling radiator and fan forcing air through the radiator and the air conditioner having a condenser mounted adjacent said radiator, means between said radiator and condenser for selectively applying a supply of water over the surface of said radiator and into the air stream of the fan lowering the temperature of said radiator.

5. In a motor cooling system for automotive vehicles having a prime mover and an air conditioner, the prime mover having a motor cooling radiator and the air conditioner having a refrigerant condenser mounted adjacent said radiator, means mounted between said radiator and condenser for selectively introducing a spray of cooling fluid onto said radiator.

References Cited in the file of this patent

UNITED STATES PATENTS

| | | |
|---|---|---|
| 1,036,484 | Glass et al. | Aug. 20, 1912 |
| 2,481,135 | Maness et al. | Sept. 6, 1949 |
| 2,715,394 | Humpola et al. | Aug. 16, 1955 |